US012663229B1

(12) United States Patent
Tran et al.

(10) Patent No.: US 12,663,229 B1
(45) Date of Patent: Jun. 23, 2026

(54) ADVANCED BATTLEFIELD COMMAND AND CONTROL SYSTEM

(71) Applicant: PKT Research Inc., Cedar Park, TX (US)

(72) Inventors: Khanh Ngoc Tran, Austin, TX (US); Prakash Narendradev Thanky, Cedar Park, TX (US)

(73) Assignee: PKT Research Inc., Cedar Park, TX (US)

( * ) Notice: Subject to any disclaimer, the term of this patent is extended or adjusted under 35 U.S.C. 154(b) by 0 days.

(21) Appl. No.: 19/291,316

(22) Filed: Aug. 5, 2025

Related U.S. Application Data

(60) Provisional application No. 63/805,053, filed on May 13, 2025.

(51) Int. Cl.
*F41A 17/08* (2006.01)
*F42B 23/24* (2006.01)
*G08B 21/18* (2006.01)

(52) U.S. Cl.
CPC .............. *F41A 17/08* (2013.01); *F42B 23/24* (2013.01); *G08B 21/18* (2013.01)

(58) Field of Classification Search
CPC ........... F41A 17/08; F42B 23/24; G08B 21/18
See application file for complete search history.

(56) References Cited

U.S. PATENT DOCUMENTS

| | | | | |
|---|---|---|---|---|
| 6,799,517 | B1 * | 10/2004 | Cahill | F42C 13/00 102/427 |
| 6,839,662 | B2 * | 1/2005 | Schnatterly | G06F 8/20 701/1 |
| 12,117,258 | B1 * | 10/2024 | Archer | F41A 27/28 |
| 2005/0115386 | A1 * | 6/2005 | LaFata | F41A 17/06 89/1.11 |
| 2007/0030156 | A1 * | 2/2007 | Schlager | G08B 21/0288 340/573.1 |

* cited by examiner

*Primary Examiner* — Daryl C Pope
(74) *Attorney, Agent, or Firm* — K&L Gates LLC

(57) ABSTRACT

Apparatus, systems, and methods for advanced battlefield command and control systems ("ACCS") are disclosed herein. The ACCS operates primarily by communication between closed-loop identification devices ("CIDD") configured to be integrated into weapons systems and as wearable components on fatigues of soldiers. The CIDDs include sensors such as gyroscopes and GPS locators which send information to an area command and control ("AC2") unit which sends commands to the CIDDs of the weapons systems. The information from the sensors is used to establish safe zones between CIDDs and determine whether a line of fire of the weapons system overlaps the safe zone. If the line of fire overlaps the safe zone, the CIDD is configured to prevent the weapons system from firing and alert an operator of the overlap.

20 Claims, 5 Drawing Sheets

ADVANCED BATTLEFIELD COMMAND AND CONTROL SYSTEM

CROSS REFERENCE TO RELATED APPLICATION

The present application claims priority to and benefit of U.S. Provisional Application No. 63/805,053 filed May 13, 2025, the entire contents of which is hereby incorporated by reference in its entirety.

FIELD OF THE INVENTION

The present invention relates to the field of armed conflicts systems and in particular relates to advanced battlefield command and control systems, apparatus, and methods.

BACKGROUND

Border protection poses a significant challenge for many countries, particularly those with extensive or rugged borders. For nations with hostile neighbors, maintaining 24/7 awareness is crucial. Domestically, narco-trafficking-related crimes result in billions of dollars in losses and thousands of lives lost. Identifying, classifying, and communicating threats is a key challenge which remains to be overcome in this domain.

Still further, friendly fire incidents in battlefield environments are tragic occurrences for every party involved. Friendly fire includes more than simply instances of errant firearm discharging in the direction of an individual compatriot, but also includes instances of discharging tank rounds, air support weapons systems, handheld explosives, buried explosives (a.k.a. mines), etc. unwittingly used to disable other friendly defense systems or cause friendly casualties.

As one specific example, armies will often place mines in certain hostile zones to deter enemy forces from crossing that area. As used herein, the term "armies" encompasses any branch of armed forces from any country, such as U.S. Armed Forces including the Army, Navy (including the Marine Corps), Air Force, Space Force, National Guard, Coast Guard, Air Guard, Border Patrol, intelligence agencies, etc. However, too many mines are often placed and it is nearly impossible to track the location of each mine even after conflict has ended. The area will become unusable or high-risk operations must be performed to clear the area.

Thus, there remains an unmet need to provide efficient and remote border protection to reduce incidence of casualties and the repurposing of lost weapons systems.

There is an even further unmet need for weapons systems able to detect the probability of and prevent instances of friendly fire in combat scenarios.

Still further, there remains an unmet need for disarming and disabling weapons systems, as well as restricting use of weapons systems to a singular user or predetermined set of users, among other remaining issues as may be apparent to those skilled in the art and from the foregoing description.

SUMMARY

The present invention provides advanced battlefield command and control systems, apparatus, and methods. Specifically, the present disclosure describes a closed-loop identification ("CID") verification system which employs certain apparatus to solve the identified issues.

In a first aspect of the present disclosure, which may be combined with any other aspect herein unless otherwise noted, an advanced battlefield command and control system includes a first closed-loop identification device configured to be integrated into a weapons system or worn on a person, the at least one closed-loop identification device comprising: at least one status indicator, at least one sensor, at least one control unit, and at least one input/output interface. The advanced battlefield command and control system further includes at least one area command and control unit configured to monitor the at least one closed-loop identification device and at least one satellite in communication with the at least one closed-loop identification device and the at least one area command and control unit. The advanced battlefield command and control system utilizes data from the at least one sensor of the at least one closed-loop identification device transmitted to the at least one area command and control unit over the at least one satellite to autonomously manipulate a status of a weapons system or person equipped with a second closed-loop identification device.

In a second aspect of the present disclosure, which may be combined with any other aspect herein unless otherwise noted, the advanced battlefield command and control system establishes a safe zone between the weapons system or person equipped with the first closed loop identification device and the weapons system or person equipped with the second closed loop identification device.

In a third aspect of the present disclosure, which may be combined with any other aspect herein unless otherwise noted, the weapons system equipped with at least one of the first closed-loop identification device and the second closed-loop identification device comprises a military aircraft.

In a fourth aspect of the present disclosure, which may be combined with any other aspect herein unless otherwise noted, the weapons system equipped with at least one of the first closed-loop identification device and the second closed-loop identification device comprises a rifle.

In a fifth aspect of the present disclosure, which may be combined with any other aspect herein unless otherwise noted, the weapons system equipped with at least one of the first closed-loop identification device and the second closed-loop identification device comprises at least one motion sensing camera.

In a sixth aspect of the present disclosure, which may be combined with any other aspect herein unless otherwise noted, the at least one motion sensing camera comprises a plurality of motion sensing cameras, and wherein the plurality of motion sensing cameras are disposed along a border of a battlefield.

In a seventh aspect of the present disclosure, which may be combined with any other aspect herein unless otherwise noted, the weapons system equipped with at least one of the first closed-loop identification device and the second closed-loop identification device comprises an armed drone.

In an eighth aspect of the present disclosure, which may be combined with any other aspect herein unless otherwise noted, the weapons system equipped with at least one of the first closed-loop identification device and the second closed-loop identification device comprises a tank.

In a ninth aspect of the present disclosure, which may be combined with any other aspect herein unless otherwise noted, the weapons system equipped with at least one of the first closed-loop identification device and the second closed-loop identification device comprises a smart mine.

In a tenth aspect of the present disclosure, which may be combined with any other aspect herein unless otherwise noted, a closed-loop identification device comprises at least one status indicator, at least one sensor, at least one control unit, and at least one input/output interface. The closed-loop identification device is configured to be integrated into at least one weapons system or worn on a person, and the closed-loop identification device is configured to be in communication with at least one area command and control unit by at least one satellite In an eleventh aspect of the present disclosure, which may be combined with any other aspect herein unless otherwise noted, the closed-loop identification device is further configured to disarm a weapons system upon which the closed-loop identification device is integrated based on a command from the area command and control unit.

In a twelfth aspect of the present disclosure, which may be combined with any other aspect herein unless otherwise noted, the command from the area command and control unit is an autonomous command.

In a thirteenth aspect of the present disclosure, which may be combined with any other aspect herein unless otherwise noted, the closed-loop identification device is configured to be integrated with at least one of a military aircraft, a rifle, a motion sensing camera, an armed drone, a tank, and a helicopter.

In a fourteenth aspect of the present disclosure, which may be combined with any other aspect herein unless otherwise noted, the at least one sensor comprises at least one of a gyroscope sensor and a GPS sensor.

In a fifteenth aspect of the present disclosure, which may be combined with any other aspect herein unless otherwise noted, the gyroscope sensor is configured to determine a line of fire for a weapons system into which the closed-loop identification device is integrated.

In a sixteenth aspect of the present disclosure, which may be combined with any other aspect herein unless otherwise noted, the at least one status indicator comprises at least one of a battery life indicator, a data reception indicator, a data transmission indicator, a device health indicator, and a wireless signal indicator.

In a seventeenth aspect of the present disclosure, which may be combined with any other aspect herein unless otherwise noted, the at least one status indicator includes an LED.

In an eighteenth aspect of the present disclosure, which may be combined with any other aspect herein unless otherwise noted, a method for preventing friendly fire or mapping a plurality of weapons systems on a battlefield comprises providing a plurality of closed-loop identification devices, the closed-loop identification devices comprising: at least one status indicator, at least one sensor, at least one control unit, and at least one input/output interface, and sending line of sight information of a weapons system with one of the plurality of closed-loop identification devices integrated to an area command and control unit, the line of sight information determined by the at least one sensor of the closed-loop identification device.

In a nineteenth aspect of the present disclosure, which may be combined with any other aspect herein unless otherwise noted, the method further comprises establishing a safe zone if two of the plurality of closed-loop identification devices are in dangerous proximity to each other, and disabling the weapons system if the line of sight information indicates that a line of sight of the weapons system overlaps the safe zone.

In a twentieth aspect of the present disclosure, which may be combined with any other aspect herein unless otherwise noted, the method further comprises sending an alert over the closed-loop identification device of the weapons system if the line of sight of the weapons system overlaps the safe zone.

In a twenty-first aspect of the present disclosure, which may be combined with any other aspect herein unless otherwise noted, a smart mine is provided, the smart mine comprising a housing, at least one charge disposed within the housing, a firing pin disposed at least partially within the housing, a detonator disposed within the housing beneath the firing pin and configured to detonate the at least one charge when struck by the firing pin, a pressure plate disposed above the firing pin and configured to translate pressure from a top side of the pressure plate to the firing pin, and a first closed loop identification device. The first closed loop identification device comprises at least one status indicator, at least one sensor, at least one control unit, and at least one input/output interface, wherein the first closed-loop identification device is configured to be electronically integrated into the smart mine and disposed within the housing and wherein the first closed-loop identification device is configured to be in communication with at least one area command and control unit by at least one satellite. The firing pin comprises an electromechanical firing pin configured to be enabled and disabled by the input/output interface of the first closed loop identification device.

In a twenty-second aspect of the present disclosure, which may be combined with any other aspect herein unless otherwise noted, the smart mine further comprises a safety clip slot disposed between the pressure plate and the firing pin and configured to removably accept a safety clip, the safety clip configured to prevent translation of pressure from the top side of the pressure plate to the firing pin while removably disposed within the safety clip slot.

In a twenty-third aspect of the present disclosure, which may be combined with any other aspect herein unless otherwise noted, the first closed loop identification device further includes a GPS sensor and a Tx-Rx module, and wherein the smart mine is configured to be located by coordinates from the GPS sensor transmitted to the at least one area command and control unit by the Tx-Rx module.

In a twenty-fourth aspect of the present disclosure, which may be combined with any other aspect herein unless otherwise noted, the first closed loop identification device is configured to cause the input/output interface to disable the electromechanical firing pin while a second closed loop identification device is determined to be within a safe zone of the smart mine.

In a twenty-fifth aspect of the present disclosure, which may be combined with any other aspect herein unless otherwise noted, the first closed loop identification device is configured to cause the input/output interface to enable the electromechanical firing pin after the second closed loop identification device is determined to have exited the safe zone of the smart mine.

In a twenty-sixth aspect of the present disclosure, which may be combined with any other aspect herein unless otherwise noted, when the second closed loop identification device enters the safe zone of the smart mine, an alert is generated on the second closed loop identification device configured to warn an owner of the second closed loop identification device of the second closed loop identification device being within the safe zone of the smart mine.

In a twenty-seventh aspect of the present disclosure, which may be combined with any other aspect herein unless otherwise noted, the at least one area command and control unit updates a recorded location of the smart mine upon at least one of burial and removal of the smart mine.

In a twenty-eighth aspect of the present disclosure, which may be combined with any other aspect herein unless otherwise noted, the input/output interface enabling and disabling of the electromechanical firing pin is controlled by a microcontroller receiving a signal from a Tx-Rx module, wherein the signal is received over at least one of a Wi-Fi signal and a satellite signal.

In a twenty-ninth aspect of the present disclosure, which may be combined with any other aspect herein unless otherwise noted, the first closed loop identification device further comprises a Tx-Rx module, and wherein the Tx-Rx module is configured to transmit a device health signal to the at least one area command and control unit.

In a thirtieth aspect of the present disclosure, which may be combined with any other aspect herein unless otherwise noted, the device health signal is transmitted to the at least one area command and control unit when the first closed loop identification device determines that a component of the smart mine requires at least one of replacement and remediation.

In light of the present disclosure and the above aspects, it is therefore an advantage of the present disclosure to provide systems, methods, and apparatus which provide efficient and remote border protection to reduce incidence of casualties and the repurposing of lost weapons systems.

It is another advantage of the present disclosure to provide weapons systems able to detect the probability of and prevent instances of friendly fire in combat scenarios.

It is another advantage of the present disclosure to provide systems capable of disarming and disabling weapons systems, as well as restricting use of weapons systems to a singular user or predetermined set of users, among other remaining issues as may be apparent to those skilled in the art and from the foregoing description.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. In addition, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Methods, systems, and apparatus are disclosed herein for controlling the use and usability of weapons systems in combat environments. Specifically, advanced battlefield command and control systems, methods, and apparatus are provided. The advanced command and control system provides top-down and automated control over all weapons systems. The advanced battlefield command and control systems are capable of exerting advanced controls of weapons systems including motion sensing cameras, armed drones (autonomous and manned), mines, tanks, helicopters, jets, infantry weapons, area command and control units, satellites, and more. These systems are implemented through various control devices integrated into the weapons systems, as will be described in more detail below and apparent to those skilled in the art from the following description.

Figure 1A:
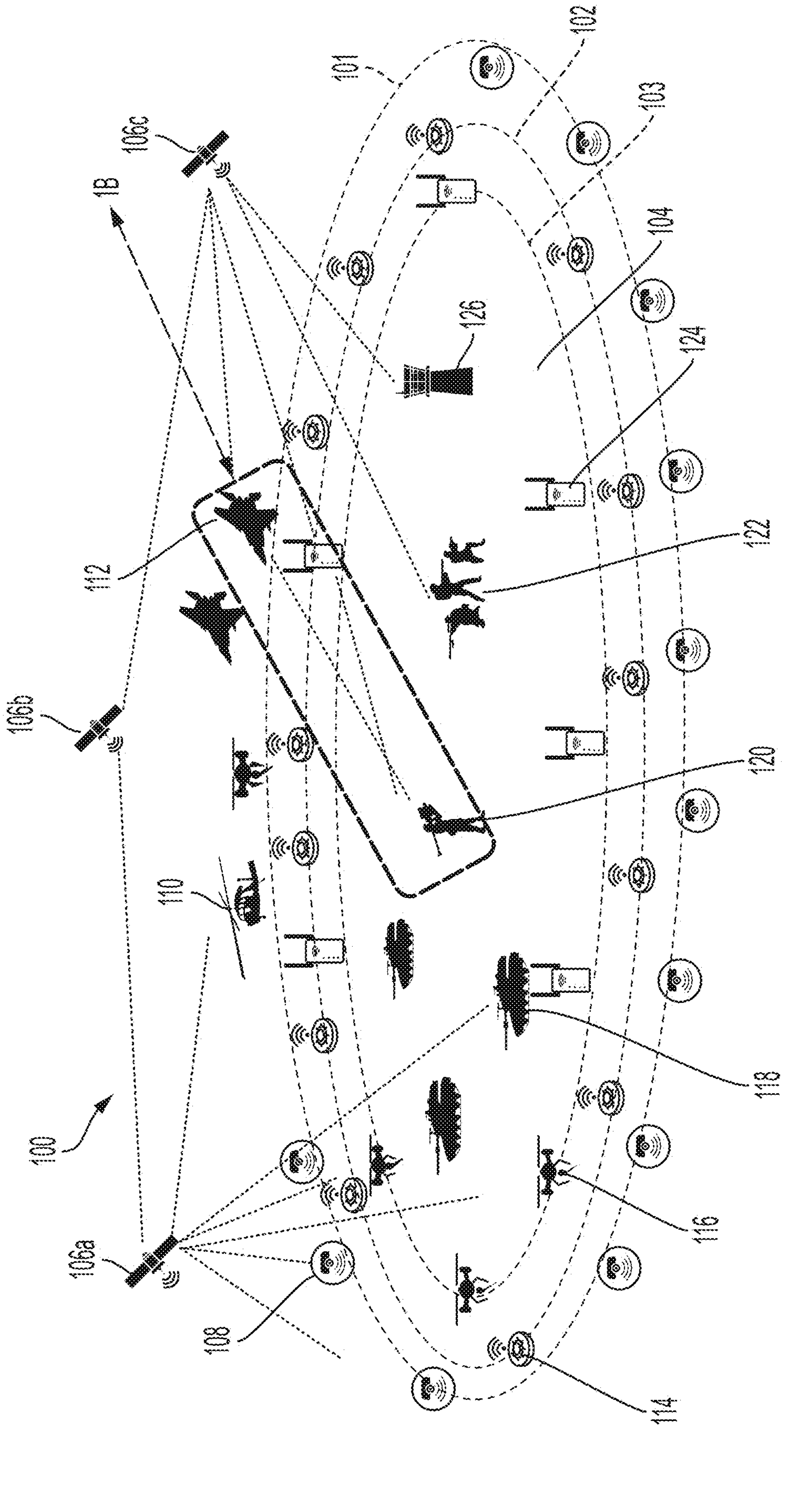
FIG. 1A shows a schematic illustration of an advanced battlefield command and control system according to an example embodiment of the present disclosure.
Figure 1B:
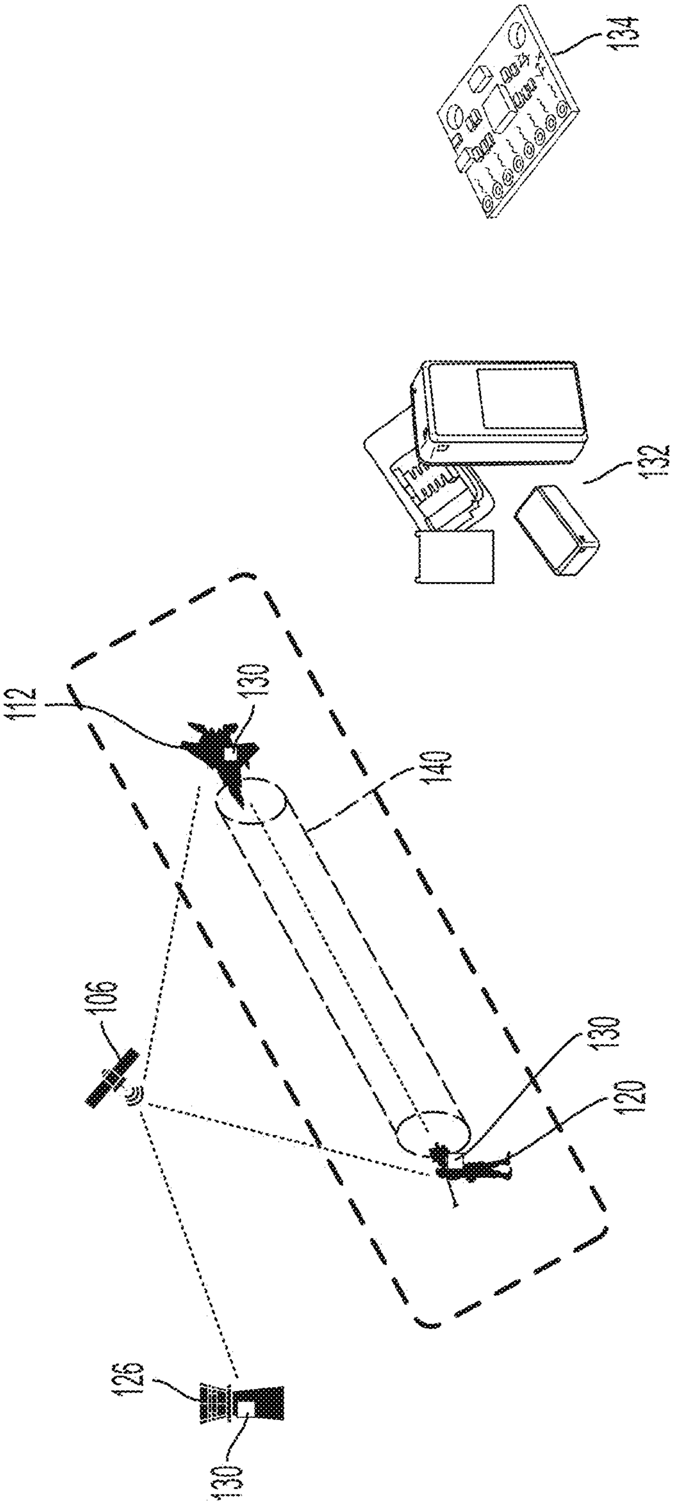
FIG. 1B shows a close-up schematic illustration of a green zone between an infantry unit and an air support unit of the advanced battlefield command and control system according to an example embodiment of the present disclosure.

Turning now to FIGS. 1A-1B, the advanced command and control system ("ACCS") 100 is implemented in battlefield environments primarily through communication between satellites 106*a-c*. This communication enables the use of closed-loop identification ("CID") verification systems implemented into the various weapons systems in the ACCS 100. The CID verification systems include a closed-loop identification device ("CIDD") device 130 implemented or integrated into the weapons systems (illustrated in greater detail in FIG. 1B). The CIDD 130 includes sensors enabling the CIDD 130 to track critical characteristics of the weapons systems. For example, a CIDD 130 configured to be implemented on a fighter jet 112 in one embodiment includes a GPS sensor 132 which delivers location information to the CIDD 130 which in turn delivers that location information to the ACCS 100 by means of the satellite 106. At the same time, a CIDD 130 configured to be implemented on an infantry weapon 120 in one embodiment includes a gyroscope sensor 134 which delivers information to the CIDD 130 as to the current line of fire for the infantry weapon 120. The information is then also relayed from the CIDD 130 to the ACCS 100 by means of the satellite 106 (which may also be any of the satellites 106*a-c* as shown in FIG. 1A).

The CIDD 130 is configured to create a lockout from the various weapons systems which disable their firing mechanisms. For example, in one embodiment, the CIDD 130 on the infantry weapon 120 includes a trigger lock, such that the CIDD 130 makes it impossible for the trigger of the infantry weapon 120 to be pulled when certain conditions are met as communicated from the ACCS 100 to the CIDD 130. In the example illustration of FIG. 1B, the known position of the fighter jet 112 along with the known line of fire of the infantry weapon 120 allows for the ACCS 100 to determine a real time safe zone 140 (which may also be referred to as a "green zone"). The green zone 140 represents a virtual area in space where, if the infantry weapon 120 is disposed such that the line of fire falls within the green zone 140, the ACCS gives a command to the CIDD 130 of the infantry weapon 120 to disarm the infantry weapon 120. This way, the infantry weapon 120 does not unwittingly fire upon the fighter jet 112, which constitutes friendly fire and could needlessly endanger the lives of those in the fighter jet 112. The green zone 140 in one embodiment is implemented using software that allows users to define the parameters of the green zone 140, such as its size and location (which may be dynamic). By automatically disabling weapons within the green zone 140, the ACCS 100 is able to mitigate risks associated with armed engagement, especially in complex scenarios where multiple assets and weapons are operating in potentially dangerous proximity to each other.

The ACCS 100 is preferably implemented on a CIDD 130 comprising a computer system configured for and housed in an area command and control ("AC2") 126 unit. The AC2 126 acts as a central control system for the ACCS 100. In this arrangement, the AC2 126 executes the ACCS 100 automatically by using the satellites 106*a-c* to communicate with and input instructions to those weapons systems that include a CIDD 130. The implementation of the ACCS 100 in an AC2 126 also allows for trained operators at the AC2 126 to input manual instructions (such as override instructions or instructions to permanently disable a weapons system). The AC2 126 unit, employing the ACCS 100 by the CIDD 130, is thus able to provide top-down control over all aspects of weapons aspects of the battlefield. For example, the CIDD 130 AC2 126 unit is configured to transmit and receive vital data in real-time from the various CIDDs 130 on the weapons systems within the ACCS 100. This data includes GPS locations of weapons systems, the current status of the weapons systems, whether the weapons systems are currently active or deactivated, and more. The AC2 126 can then monitor and map all the associated CIDD 130 devices in real-time, heling to prevent friendly fire incidents and the misclassification of potential threats.

The satellites 106*a-c* are military battlefield satellites, which provide capabilities such as surveillance, communication, navigation, and reconnaissance. The satellites 106*a-c* in some embodiments are equipped with advanced sensors and imaging technologies to monitor enemy movements, infrastructure, and activities in real-time, enhancing situational awareness and strategic planning. In some embodiments, the satellites 106*a-c* also ensure secure and reliable communication between various military units, facilitating coordination and decision-making on the battlefield. In yet more embodiments, satellites 106*a-c* are like those used in Global Positioning Systems provide precise location data, which aids in guiding troops and equipment, especially in complex environments. The satellites 106*a-c* in some embodiments also assist in targeting and guiding missiles, ensuring accuracy and effectiveness in military operations. Finally, the satellites are in some embodiments also employed in electronic and cyber warfare, where they are used to jam enemy communications or intercept electronic signals.

In some embodiments, the AC2 126 system is equipped with the latest state-of-the-art AI capabilities, enabling the AC2 126 to monitor and map all CIDDs 130 in the ACCS 100 in real-time. This ensures precise and up-to-date tracking of all CIDDs 130, enhancing situational awareness and operational efficiency. Real-time monitoring offers several significant benefits for commanders. One benefit is enhanced situational awareness, in that commanders are able to see the current status and location of all units and assets, allowing the commanders to make informed decisions quickly. A second benefit is improved coordination, in that the real-time data allows commanders to coordinate movements and actions more effectively, ensuring that all units are working together seamlessly. A third benefit is improved rapid response, in that immediate access to information enables commanders to respond swiftly to changing battlefield conditions, threats, or opportunities. A fourth benefit is reduced friendly fire incidents, in that by continuously tracking the positions of friendly forces, real-time monitoring helps prevent accidental engagements and enhances overall safety. A fifth benefit is improved resource management, in that commanders are better able to allocate resources, such as ammunition and medical supplies, based on the real-time needs of their units. A sixth benefit is strategic planning, in that real-time data supports more accurate and dynamic planning, allowing commanders to adapt strategies as situations evolve. A seventh benefit is increased operational efficiency, in that continuous monitoring helps identify and address issues promptly, minimizing downtime and maximizing the effectiveness of operations. Overall, real-time monitoring, as enabled by the ACCS 100, empowers commanders with the information needed to lead more effectively and achieve mission objectives with greater precision and safety. Other benefits besides those enumerated will be appreciated by those of skill in the art, and the benefits listed here are not intended to narrow the scope of the disclosure in any regard.

Certain specific implementations as illustrated in FIG. 1A are described below. These implementations describe embodiments of how the ACCS 100 may be implemented in certain weapons systems and is not intended to be an exhaustive list of weapons systems in which the ACCS 100 may be implemented.

Implementations of the CIDDs 130 described below equipped with gyroscope sensors 134, GPS sensors 132, and bidirectional satellite communication can offer precise tracking and monitoring capabilities. The sensors aid in measuring orientation and angular velocity, which can be crucial for navigation, motion detection, stabilization, and other applications. Real-time satellite communication enables immediate data transmission and reception, enhancing responsiveness and operational efficiency in battlefield and hostile environments.

As previously described, the ACCS 100 is in one embodiment implemented by a CIDD 130 integrated into an infantry weapon 120. The CIDD 130 includes a gyroscope sensor 134 in order to determine a line of fire for the infantry weapon 120, and also includes a GPS sensor 132 so that the ACCS 100 is able to determine the location of the infantry weapon 120 at any given time. This allows green zones 140 to be determined in order to protect the infantry weapon 120. By implementing the ACCS 100 on the infantry weapons 120, the infantry units carrying the infantry weapons experience enhanced safety measures to prevent friendly fire incidents. For example, line-of-sight weapons typically carried by infantry (most commonly rifles) are integrated with a CIDD 130 which tracks the current location of the line-of-sight weapon and what the weapon is pointed at, which prevents unwitting friendly fire. Additionally, the AC2 126 communications systems are configured to relay the locations of the infantry using the CIDDs 130 in forward positions, which prevents indirect friendly fire. When a potential friendly fire situation is detected (i.e. when an infantry weapon 120 is oriented in the green zone 140), the CIDD 130 alerts the solder or artillery unit operating that infantry weapon 120.

The AC2 126 can also disarm or permanently deactivate infantry weapons 120 that fall into enemy hands. For example, if a hostile actor acquires a rifle dropped by an infantryman, the AC2 126 sends a signal to the CIDD 130 of the rifle to permanently disarm that rifle (by making the weapon unusable by a deliberately-placed charge or by locking out parts of the weapon, for example). The ACCS 100 can also be used for disarming weapons that were purposefully given to certain actors, but which actors have become hostile, or who were for example only given these weapons for tracking purposes.

The ACCS 100 in some embodiments is also implemented by CIDDs 130 integrated into advanced weapons platforms, including tanks 118, aircraft 112, helicopters 110, and more. These advanced weapons platforms employ the CIDDs 130 to prevent friendly fire incidents. For example, pilots or copilots are able to view all CIDD 130 locations on the ground or battlefield through interface with the AC2 126. When the advanced weapons systems or other weapons systems in the ACCS 100 are aimed at friendly targets, such a soldiers (in infantry units 122), tanks 118, aircraft 112, or others, the CIDD 130 ensures that a green zone 140 is established between each of these weapons systems to avoid friendly fire. As with the infantry weapons 120, the CIDDs 130 implemented on the advanced weapons platforms are also used to deactivate or disarm the advanced weapons platforms if they fall into enemy possession, and also monitor the health and status of these advanced weapons platforms. For example, the CIDD 130 on a tank 118 is configured to provide real-time updates to the AC2 126 on status such as remaining munitions, fuel levels, oil levels, interior temperatures, etc. The CIDD 130 on an aircraft 112 or helicopter 110 is configured to provide real-time updates to the AC2 126 on status such as remaining munitions, fuel levels, elevation, velocity, oxygen levels, etc.

The ACCS 100 is also implemented in one embodiment on motion sensing cameras 108 with a CIDD 130 integrated. A plurality of the motion sensing cameras 108 is hidden and strategically located along boundaries of interest, for instance a border of a country or a border of a battlefield, such as an exterior perimeter 101 of a battlefield 104. The motion sensing cameras 108 are embedded with AI processing chips that are configured to recognize and categorize potential threats. In some embodiments, the AI chips are integrated into the CIDD 130 of each motion sensing camera 108. Upon detection of a threat, the relevant image is sent to the AC2 126 and the camera 108 simultaneously activates a drone 116 (described in further detail below) to corroborate and verify the threat via one or more satellite 106*a-c*. These cameras 108 are in some embodiments powered by solar cells or military grade batteries to ensure continuous, uninterrupted operation. The AC2 126 also monitors the status and health of the cameras 108 by way of the CIDDs 130 in order to verify their continued functionality.

AI chips are preferred for accelerating the AI applications of systems such as the motion sensing cameras 108. The AI chips enable faster processing and improve the efficiency of the AI systems. AI chips contain units specifically designed for AI tasks, such as neural network computations, matric multiplications, and convolution operations. These AI units are optimized to handle the complex mathematical operations required for AI algorithms. Unlike traditional CPUs that process tasks sequentially, AI chips are built to perform multiple calculations simultaneously. This parallelism enables the handling of data-intensive and computationally heavy tasks involved in AI, such as training large models and real-time inference. AI chips are also equipped with high-bandwidth memory and efficient memory access mechanisms to ensure that data is constantly fed to the processing units without bottlenecks. This setup helps in maintaining high throughput and performance. AI chips are further designed to be power-efficient, making them suitable for deployment in environments with limited power resources, such as edge devices and other mobile platforms. They incorporate various techniques to reduce power consumption and heat dissipation. Finally, the performance of AI chips is enhanced by specialized software, including compilers and frameworks such as TensorFlow and PyTorch. These tools optimize the utilization of the chip's resources, ensuring efficient execution of AI tasks.

The ACCS 100 is further implemented by CIDDs 130 configured to be integrated into armed drones 116. These drones 116 included manned and unmanned drones. The drones 116 in one embodiment are unmanned drones equipped with a weapon, a speaker, and a camera for enhanced versatility between various missions. Such drones 116 are typically deployed from a silo or housing to protect the drone 116 from inclement weather and enhance camouflaging.

The ACCS is yet further implemented by CIDDs 130 configured to be integrated into smart mines 114. The CIDDs 130 enable communication between the mines 114 and the AC2 126. Such mines 114 are in some embodiments disposed around an intermediate perimeter 102 of a battlefield 104. The CIDDs 130 provide activating/deactivating, locating, and status monitoring operability to the AC2 126 for the mines 114. For example, if a CIDD 130 of an infantry weapon 120 equipped with a GPS 132 is detected to be in a dangerous proximity to the CIDD 130 of a smart mine 114 equipped with a GPS 132, a green zone 140 is established that includes the smart mine 114, and the AC2 126 autonomously sends a signal to the smart mine 114 to deactivate its detonating mechanism until the infantry weapon 120 is clear of the green zone 140. In this way, the AC2 126 acts as a central hub, processing data from all connected devices in the ACCS 100 and making real-time adjustments to optimize mining operations. Internet of Things ("IoT") devices are also embedded into the equipment and infrastructure of the smart mines 114 in some embodiments. These IoT devices collect and transmit data in real-time, allowing for continuous monitoring and control of the smart mines 114. In some embodiments, AI and/or machine learning algorithms are implemented to analyze the data collected by IoT devices in order to optimize operations, predict maintenance needs, and enhance decision-making processes for the ACCS 100. Autonomous machinery installed on the smart mines 114 performs tasks that would traditionally require human intervention, such as deactivating the mines 114. This machinery reduces the risk to human workers and increases operational efficiency. Sensors on the CIDD 130 are configured to monitor the condition of equipment on the mine 114 and predict when maintenance is needed, preventing unexpected breakdowns and extending the lifespan of the machinery. As a result of these enhancements, a more efficient, safer, and more cost-effective mining environment is collectively achieved.

The CIDD 130 is in some embodiments designed as a wearable technology for soldiers, such as those in infantry units 122. By attaching CIDDs 130 to individual soldiers, the instance of friendly fire is significantly reduced on the battlefield. By integrating advanced identification and tracking systems, these CIDDs 130 allow for real-time location data and friend-or-foe identification. This enhances the situational awareness of each soldier by allowing them to quickly verify each other's positions. Additionally, the CIDDs 130 configured for use as a wearable technology on individual soldiers in some embodiments includes alerts for potential friendly fire scenarios, communication capabilities between soldiers and with other weapons systems (and their operators) in the ACCS 100, and environmental monitoring to improve safety and coordination between and among units. Implementing the CIDD 130 minimizes tragic battlefield mistakes and enhances overall mission effectiveness. In some embodiments, the AC2 126 unit, employing the ACCS 100 is configured to detect the removal of a CIDD 130 from a fallen soldier, such as a soldier in the infantry unit 122. The CIDD 130 may detect that a soldier has fallen by, for example, a heartrate sensor included in the CIDD 130. In the case that a CIDD 130 detects that a soldier has fallen and also detects movement by the GPS sensor 132 and/or gyroscope sensor 134, the AC2 126 unit is notified of the condition and of the last known location of the CIDD 130. The CIDD 130 is, in some embodiments, configured to automatically deactivate (either temporarily or permanently) upon sensing this condition. In other embodiments, the AC2 126 unit is configured to give a command to the CIDD 130 to deactivate upon sensing this condition. In yet other embodiments, the AC2 126 unit is configured to provide an alert and/or alarm to a user at the AC2 126 unit, which user may then input a command to the CIDD 130 to deactivate. In still further embodiments, the CIDD 130 is configured to automatically deactivate after a predetermined time period if no command from the AC2 126 unit to deactivate has been received.

In some embodiments, there are mechanical and/or electrical disable switches included on the CIDD 130, for example on the back of the CIDD 130, that can be used to disable the CIDD 130 after removal from a soldier's body, whether by the soldier or by another in the case of a fallen soldier (for example, another soldier in the infantry unit 122). The CIDD 130 in some embodiments is configured to be reprogrammed and/or reactivated by a user of the ACCS 100 with security clearance to do so. Security clearance is validated by, for example, biometric or security pin IDs. Each soldier in an infantry unit 122, each user of the ACCS 100, and/or each CIDD 130 in the ACCS 100 in some embodiments has a unique security pin ID or biometric profile which allows access to the ACCS 100 and/or the CIDD 130, and which may be used to associate a certain CIDD 130 with a user or soldier. In some embodiments, validation is periodically performed as prompted by the ACCS 100 via the AC2 126 unit. Validation is, for example, performed by a lock-out on the CIDD 130 which may be cleared only by entering of the associated security pin ID or biometric profile. In some embodiments, the AC2 126 unit includes a dynamic password system that periodically transmits new security codes to any number of CIDDs 130 in the ACCS 100 or users in the ACCS 100 in order to prevent unauthorized access by enemy forces (including computer hackers).

Wi-Fi extenders 124 are in some embodiments disposed along an interior perimeter 103 of a battlefield 104 or a hostile side of a border. The Wi-Fi extenders 124 include their own CIDD 130 and help ensure that signal is never lost between CIDDs of the weapons systems and the AC2 126 in the ACCS 100.

Figure 2:
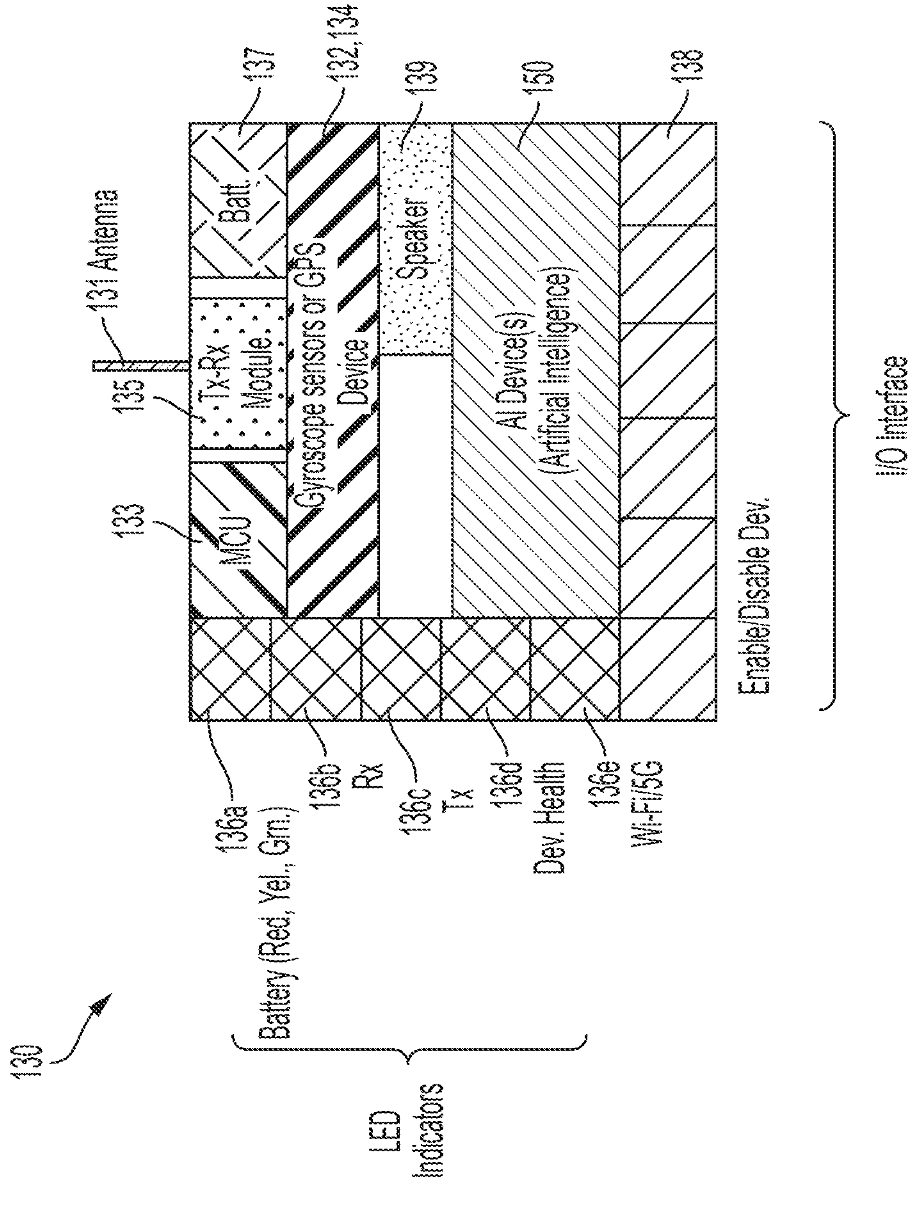
FIG. 2 shows a schematic of a CIDD of the advanced battlefield command and control system according to an example embodiment of the present disclosure.

Turning now to FIG. 2, a schematic of one embodiment of a CIDD 130 is illustrated. The CIDD 130 includes LED indicators 136*a-e* which display certain status indicators for the operators (e.g. infantry soldiers for a CIDD 130 installed on an infantry weapon 120). These LED indicators 136*a-e* include in one embodiment a battery indicator 136*a*, a data reception ("Rx") indicator 136*b*, a data transmission ("Tx") indicator 136*c*, a device health indicator 136*d*, and a network connection indicator 136*e*. The LED indicators 136*a-e* in some embodiments include different colors of LEDs to indicate the status (e.g. green, yellow, and red LEDs). Further, the LEDs are be configured to blink when certain conditions are met (e.g. the Rx indicator 136*b* and Tx indicator 136*c* blink while data is being received and transmitted). The battery indicator 136*a* is configured to display the status of a battery 137 of the CIDD 130. The Rx indicator 136*b* and Tx indicator 136*c* are configured to indicate the status of the receiving and transmitting activities of a Tx-Rx module 135 of the CIDD 130, which activities are facilitated by an antenna 131. The device health indicator 136*d* is configured to indicate the status of and alert an operator as to any issues with the CIDD 130 and/or the weapon the CIDD 130 is integrated into, such as issues with the gyroscope sensor 134 or GPS sensor 132. The network connection indicator 136*e* is configured to indicate the connection to a Wi-Fi network, 5G or other cellular network, or satellite. A speaker 139 is provided which gives instructions to an operator or act as a secondary indicator to give verbal feedback on the status of various systems of the CIDD 130. An I/O interface 138 is provided in some embodiments as a plurality of virtual buttons. In alternative embodiments, the I/O interface 138 is a plurality of physical buttons. In yet other alternative embodiments, the I/O interface 138 includes a command prompt for inputting commands to the CIDD 130. The CIDD 130 is controlled by a processor or control unit such as a micro control unit 133 included in the CIDD 130.

The CIDD 130 also includes AI devices 150, which may take the form of AI-enabled characteristics of portions of the CIDD 130, for example AI-enabled heartrate monitors, device health monitors, etc. As used herein, artificial intelligence (AI) is at least a set of technologies that enable computers to perform a variety of advanced functions, including the ability to see, understand, and translate spoken and written language, analyze data, make recommendations, and more. AI may be implemented as advanced computing techniques, large language models, natural language processing, and/or generative AI. The CIDD 130 in some embodiments uses AI devices 150 to render information pertaining to the CIDD 130 delivered by the various sensors and systems and yield information to be transmitted to the AC2 126 unit or elsewhere in the ACCS 100. AI devices 150 in the AC2 126 unit or other CIDDs 130 in communication with the instant CIDD 130 are configured to process information received at the AC2 126 unit or other CIDD 130, which may be information from the rendering of the AI device 150 at the instant CIDD 130. For instance, the AI device 150 of the instant CIDD 130 may process information received from the GPS sensor 132, gyroscope sensor 134, I/O interface 138, and/or heartrate sensor to determine that a soldier has fallen and the instant CIDD 130 has been captured by an enemy using advanced computing techniques and generate a custom alert message to be sent to the AC2 126 unit by the Tx-Rx module 135 using generative AI techniques. In another example, the AI device 150 is configured to render, using natural language processing and/or large language model techniques, a custom natural language message received at the Tx-Rx module 135 from the AC2 126 unit and perform an action based on the rendered message. In this manner, an operator of the AC2 126 unit is able to send a message in response to an alert and/or alarm by speaking into a microphone a message such as "deactivate [Ser. No.]'s device" that is processed by the AI device 150 of the instant CIDD 130 in order to deactivate the instant CIDD 130. This promotes fast, efficient use of the ACCS 100 to accomplish critical tasks with ease. Although specific examples are given above, it should be understood to those of skill in the art that these examples are not intended to limit the scope of the uses or applications of the AI device 150, but are merely illustrative.

In some embodiments, the CIDD 130 and the ACCS 100 more generally rely on wireless signals to operate. Certain types of wireless signals are specifically designed to be highly resistant to jamming, ensuring reliable communication even in hostile environments. This resilience is preferable for maintaining coordination and operational effectiveness during missions. Such signals include, for example, spread spectrum signals, frequency hopping, and encrypted signals. Spread spectrum signals spread their data over a wide range of frequencies, making it difficult for a jammer to block the entire spectrum. Frequency hopping is a technique which rapidly changes the frequency of the signal, making it hard for jammers to keep up. Encrypted signals are more resistant to jamming because they require the correct decryption key to be obtained. Such systems or a combination thereof are preferably integrated into the ACCS 100 to ensure reliability and security.

In some alternative embodiments, the CIDD 130 utilizes short range wireless signals to determine proximity with another CIDD 130 and/or determine a green zone 140 in relation to another nearby CIDD 130 by communicating information such as location and line-of-sight information between the CIDDs 130 over the short range signal. In some embodiments the short range signal is utilized only when a satellite connection to one of the satellites 106*a-c* cannot be reached or in tandem with the satellite connection of the ACCS 100.

In some alternative embodiments, the CIDD 130 is distributed and integrated into separate physical portions of one of the devices of the ACCS. For example, each component of the CIDD 130 in some embodiments is distributed throughout and in different physical locations of the AC2 126 unit, and each component of the CIDD 130 is communicatively coupled to maintain the integrity of the CIDD 130.

Figure 3:
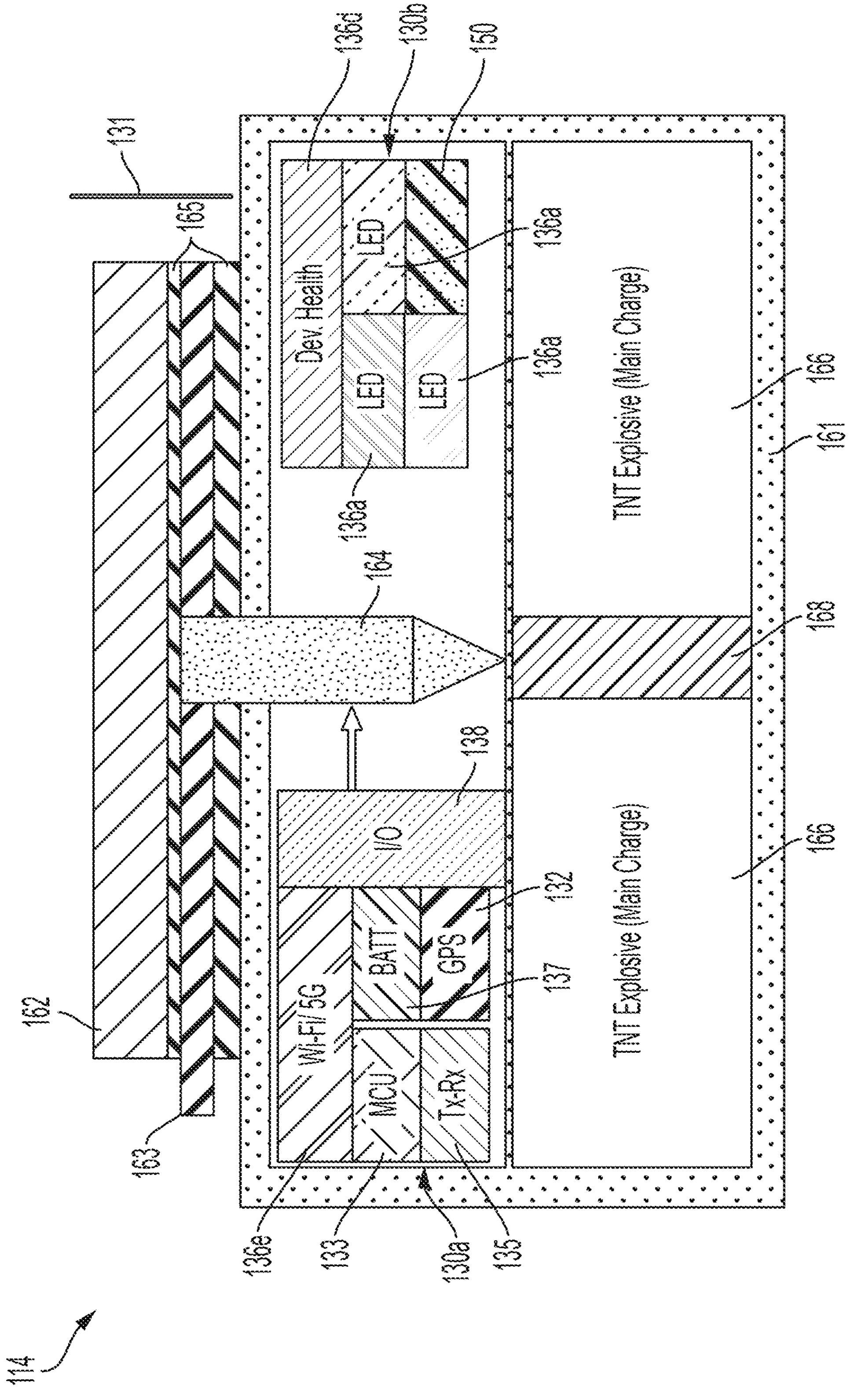
FIG. 3 shows a schematic representation of a smart mine employing a CIDD of the advanced battlefield command and control system according to an example embodiment of the present disclosure.

Turning now to FIG. 3, a schematic of one embodiment of the smart mines 114 of the ACCS 100 is illustrated in finer detail. The smart mine 114 includes a CIDD 130*a*, 130*b*, which in the embodiment of FIG. 3 is distributed throughout the smart mine 114 in two locations. The smart mine 114 includes a housing 161 which substantially surrounds a charge 166 which in some embodiments is TNT explosive. In alternative embodiments, the charge 166 comprises a plastic explosive or another explosive and detonatable substance as may be appreciated by those of skill in the art. A detonator 168 is placed at least partially within the charge 166 and is configured to detonate when struck by a firing pin 164. A pressure plate 162 is disposed above a top surface of the housing 161. A safety clip 163 is disposed within a safety clip slot 165 for transportation and/or placement of the smart mine 114 by an operator. The safety clip 163 provides a physical, analog barrier to prevent detonation of the smart mine 114 before it is in position for deployment.

In the embodiment of FIG. 3, the firing pin 164 is an electromechanical firing pin 164 which is communicatively coupled to the I/O interface 138 of the CIDD 130*a*. The I/O interface 138 allows the CIDD 130*a*, 130*b* to control the activation and/or deactivation of the firing pin 164. In order for the smart mine 114 to detonate, the safety clip 163 must be removed from the safety clip slot 165 and the firing pin 164 must be activated or enabled by the CIDD 130*a*, 130*b*. Once the smart mine 114 is placed and ready for deployment, for example when the housing 161 is substantially buried in the ground with the pressure plate 162 exposed, the safety clip 163 can be removed, allowing remote activation of the smart mine 114 by the CIDD 130*a*, 130*b* remotely through the Tx-Rx module 135 via the network connection (such strength of the network connection indicated by the network connection indicator 136*e*). A micro control unit 133 provides control for the various operative aspects of the CIDD 130*a*, 130*b* such as controlling the activation and/or enablement of the electromechanical firing pin 164. This control by the CIDD 130*a*, 130*b* in the smart mine 114 allows an AC2 126 unit or an infantryman in an infantry unit 122 utilizing a laptop operatively coupled to the ACCS 100 by a CIDD 130 or other control application to remotely send an input to the I/O interface 138 of the smart mine 114, causing the micro control unit 133 to activate, deactivate, enable, or disable the firing pin 114.

The GPS sensor 132 of the CIDD 130*a* allows for the location of the smart mine 114 to be monitored by other CIDDs 130 or entities in the ACCS 100. Real time monitoring of the location of the smart mine 114 by the ACCS 100 (for example by sending a signal via the Tx-Rx module 135 to a AC2 126 unit indicating the GPS position of the smart mine 114) allows for collection of the smart mines 114 after conflict has ceased in the specific area, and further allows for the smart mine 114 to be reused after the proximate purpose for which it was deployed has ceased. This presents a significant cost savings for defense entities both in the efforts to clear an area of mines after conflict has ended and also in reclaiming mines for future reuse. The monitoring of the location of the smart mine 114 also allows the ACCS 100 to establish a green zone 140 for the smart mine 114 to ensure that none of the other weapons systems or infantry units 122 in the ACCS 100 are inadvertently exposed to friendly fire from the smart mine 114. For example, if an infantry unit 122 in the ACCS 100 (such as an infantry unit 122 with each infantryman equipped with a CIDD 130) comes within range of the green zone 140, the CIDD 130*a*, 130*b* is configured to automatically disable or deactivate the firing pin 164 and prevent detonation of the smart mine 114 until the infantry unit 122 leaves the green zone 140. In some embodiments, operators of the various weapons systems equipped with a CIDD 130 are able to see the location of each smart mine 114 in the ACCS 100 and thereby avoid coming within dangerous proximity of the smart mine 114 in the first instance (such as, for example, by avoiding entering the green zone 140 of the smart mine 114). Real time monitoring of the location of the smart mine 114 also ensures that if the smart mine 114 is acquired by unfriendly forces, another weapons system in the ACCS 100 is alerted and able to remotely deactivate or disable the smart mine 114, rendering it unable to be used by the hostile entity. The CIDD 130*a*, 130*b* in some embodiments is configured to automatically disable or deactivate the smart mine 114 when it is determined that the smart mine 114 has been acquired by an unfriendly force. This determination, in some embodiments, is made by the micro control unit 133, in communication with the GPS sensor 132, sensing that the smart mine 114 has moved while active and/or enabled, or sensing that the smart mine 114 has moved without another weapons system in the ACCS 100 within proximity of the smart mine 114 (for example within a few feet of the smart mine 114).

The Tx-Rx module 135 is also employed to monitor the health of the smart mines 114 by sending wireless signals to other weapons systems in the ACCS 100 (for example, a AC2 126 unit) when device health, or battery 137 level and/or health, is indicated to be diminished by the device health indicator 136*d*. The CIDD 130*a*, 130*b* is optionally configured to monitor the health of any of the electronics systems on the smart mine 114 and send an indication of a malfunction to another weapons system in the ACCS 100 through the Tx-Rx module 135. Different color LEDs 136*a* are employed in some embodiments to show the status of any of the electronics systems of the smart mine 114 to an operator.

The safety clip 163 also aids in servicing the smart mine 114 by providing a way of physically preventing detonation of the smart mine 114 while performing service operations, such as replacing the battery 137 which powers each of the electronic components, removing the smart mine 114 to another location, replacing other electronic components or sensors, or other service operations. The safety clip slot 165 is configured to accept the safety clip 163 at any time, even after deployment and removal of the safety clip 163 in the first instance, so that operations can be safely performed. In some embodiments, the CIDD 130*a*, 130*b* includes a sensor which senses the presence of the safety clip 163 in the safety clip slot 165, and the CIDD 130*a*, 130*b* is configured to automatically disable or deactivate the smart mine 114 when the safety clip 163 is sensed to be at least partially within the safety clip slot 165.

In some embodiments, the CIDD 130*b* includes an AI device 150 which is configured to provide advanced computing techniques to the smart mine 114. The AI device 150 provides advanced decision-making for the smart mine 114 which aids the micro control unit 133 in determining when certain conditions are met to actuate systems under control of the micro control unit 133. For example, the AI device 150 in some embodiments uses deep machine learning techniques to provide autonomous instructions to the CIDD 130*a*, 130*b* of the smart mine 114 to disable or deactivate the smart mine 114 in situations where the CIDD 130*a*, 130*b* determines that the smart mine 114 has moved without another CIDD 130 of the ACCS 100 within a proximity of the smart mine 114. In one example, the AI device 150 uses a record of data from the GPS sensor 132 to determine that a sudden and major departure from an established location of the smart mine 114 is indicative of a malfunction of the GPS sensor 132 or GPS system to which the GPS sensor is communicatively coupled, rather than that the smart mine has been acquired by hostile forces, and therefore that no disablement or deactivation is necessary. The AI device 150, in some further embodiments, is configured to cause the CIDD 130*a*, 130*b* to send an alert to another weapons system in the ACCS 100 that the GPS sensor 132 has experienced a malfunction so that the GPS sensor 132 can be serviced. The AI device 150, in some embodiments, provides further advanced computing techniques to aid the CIDD 130*a*, 130*b* in monitoring the health of the smart mine 114 and provide detailed information on the degradation of health of any of the components of the smart mine 114 to at least one other weapons system in the ACCS 100 so that servicing of the smart mine 114 is safe, efficient, and accurate. In one example, the AI device 150 provides deep machine learning techniques to determine that the GPS sensor 132 has malfunctioned (as described above) and that a replacement of the GPS sensor 132 is necessary. The AI device 150 in this example provides information such as the make and model of the current GPS sensor 132, a serial number of the GPS sensor 132, a list of which GPS sensors 132 are adequate and compatible replacements, how to remove the old GPS sensor 132 and install a new GPS sensor 132 according to the specific model, and other information as may be helpful to an operator servicing the smart mine 114. Although the example given is for the GPS sensor 132, those of skill in the art will appreciate that such monitoring and information determination can be performed for any of the electronic systems of the smart mine 114 using the AI device 150.

In some embodiments, the ACCS 100 employs a dynamic password system (DPS) to protect the use and communication between components on the ACCS 100, such as CIDDs 130 and components employing CIDDs 130 (for example AC2 126 units, smart mines 114, and others as described throughout), Wi-Fi networks employed by the ACCS 100, satellite networks employed by the ACCS 100, computers used in the ACCS 100, and any other electronic component of the ACCS 100 as may be appreciated by the skilled artisan. The DPS uses dynamic passwords to protect these components. A dynamic password in some embodiments is a type of password that changes with some degree of frequency, which itself may be a static frequency or a dynamic frequency. For example, a static frequency may be a predetermined, regular interval, and a dynamic frequency may be a random interval or a change after use of the single password. A dynamic password may be contrasted to a static password, which remains the same until manually changed by a user. The DPS enhances security by making it more difficult for unauthorized users to gain access to the password, and by making it difficult for the unauthorized user to utilize an a password, even if acquired, by limiting the timeframe in which that password is usable. The DPS may employ the following forms of dynamic password: One-Time Passwords (OTPs) which are generated for a single session or transaction and which expire after each use; Time-Based One-Time Passwords (TOTPs) which change at regular intervals (for example, every 30 seconds) and are synchronized with a server; and Event-Based One-Time Passwords (HOTPs) which change after a specific event (for example, after a login attempt or a certain amount of failed login attempts).

Figure 4:
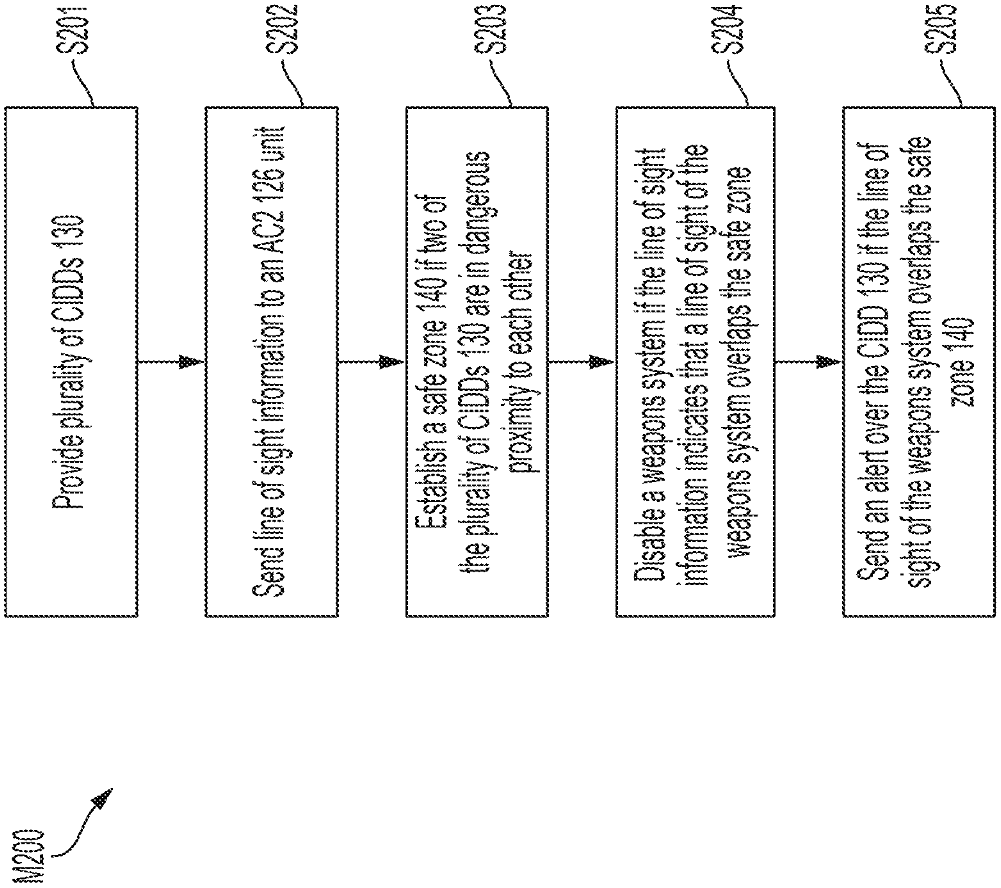
FIG. 4 shows a flow diagram of a method of preventing friendly fire and/or mapping of weapons systems, according to an embodiment of the present disclosure.

Turning now to FIG. 4, a method M200 of preventing friendly fire and/or mapping of weapons systems is illustrated. The method M200 begins at step S201 with providing a plurality of CIDDs 130. Then, step S202 includes sending line of sight information of a weapons system with one of the plurality of CIDDs 130 integrated to an AC2 126 unit, the line of sight information determined by the at least one sensor of the CIDD 130. At step S203, the method M200 establishes a safe zone 140 if two of the plurality of CIDDs 130 are in dangerous proximity to each other. At step S204, the weapons system is disabled if the line of sight information indicates that a line of sight of the weapons system overlaps the safe zone 140. At step S205, an alert is sent over the CIDD 130 of the weapons system if the line of sight of the weapons system overlaps the safe zone 140. Alternative embodiments and derivatives of the described method will be appreciated by those of skill in the art in light of the above description.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An advanced battlefield command and control system comprises:

a first closed-loop identification device configured to be worn on a person, the at least one closed-loop identification device comprising:

at least one status indicator;
at least one sensor;
at least one control unit;
at least one input/output interface; and
a device health indicator, the device health indicator configured to provide an indication that a component of the first closed-loop identification device requires at least one of replacement and remediation;
at least one area command and control unit configured to monitor the at least one closed-loop identification device; and
at least one satellite in communication with the at least one closed-loop identification device and the at least one area command and control unit,
wherein the advanced battlefield command and control system utilizes data from the at least one sensor of the at least one closed-loop identification device transmitted to the at least one area command and control unit over the at least one satellite to autonomously manipulate a status of a weapons system equipped with a second closed-loop identification device.

2. The system of claim 1, wherein the advanced battlefield command and control system establishes a safe zone between the person equipped with the first closed loop identification device and the weapons system equipped with the second closed loop identification device.

3. The system of claim 2, wherein the weapons system equipped with the second closed-loop identification device comprises a smart mine.

4. A closed-loop identification device, comprising:
at least one status indicator;
at least one sensor;
at least one control unit;
at least one input/output interface; and
a device health indicator, the device health indicator configured to provide an indication that a component of the closed-loop identification device requires at least one of replacement and remediation,
wherein the closed-loop identification device is configured to be integrated into at least one weapons system,
wherein the closed-loop identification device is configured to be in communication with at least one area command and control unit by at least one satellite.

5. The device of claim 4, wherein the closed-loop identification device is further configured to disarm a weapons system upon which the closed-loop identification device is integrated based on a command from the area command and control unit.

6. The device of claim 4, wherein the at least one sensor comprises at least one of a gyroscope sensor and a GPS sensor.

7. The device of claim 6, wherein the gyroscope sensor is configured to determine a line of fire for a weapons system into which the closed-loop identification device is integrated.

8. The system of claim 3, wherein the smart mine comprises:
a housing;
at least one charge disposed within the housing;
a firing pin disposed at least partially within the housing;
a detonator disposed within the housing beneath the firing pin and configured to detonate the at least one charge when struck by the firing pin; and
a pressure plate disposed above the firing pin and configured to translate pressure from a top side of the pressure plate to the firing pin,
wherein the second closed loop identification device comprises:
at least one status indicator;
at least one sensor;
at least one control unit; and
at least one input/output interface,
wherein the second closed-loop identification device is configured to be electronically integrated into the smart mine and disposed within the housing,
wherein the second closed-loop identification device is configured to be in communication with at least one area command and control unit by at least one satellite, and
wherein the firing pin comprises an electromechanical firing pin configured to be enabled and disabled by the input/output interface of the second closed loop identification device.

9. The system of claim 8, wherein the smart mine further comprises a safety clip slot disposed between the pressure plate and the firing pin and configured to removably accept a safety clip, the safety clip configured to prevent translation of pressure from the top side of the pressure plate to the firing pin while removably disposed within the safety clip slot.

10. The system of claim 8, wherein the second closed loop identification device further includes a GPS sensor and a Tx-Rx module, and wherein the smart mine is configured to be located by coordinates from the GPS sensor transmitted to the at least one area command and control unit by the Tx-Rx module.

11. The system of claim 10, wherein the second closed loop identification device is configured to cause the input/output interface to disable the electromechanical firing pin while the first closed loop identification device is determined to be within the safe zone.

12. The system of claim 11, wherein the second closed loop identification device is configured to cause the input/output interface to enable the electromechanical firing pin after the first closed loop identification device is determined to have exited the safe zone.

13. The system of claim 11, wherein when the first closed loop identification device enters the safe zone, an alert is generated on the first closed loop identification device configured to warn an owner of the first closed loop identification device that the first closed loop identification device is within the safe zone of the smart mine.

14. The system of claim 10, wherein the at least one area command and control unit updates a recorded location of the smart mine upon at least one of burial and removal of the smart mine.

15. The system of claim 8, wherein the input/output interface enabling and disabling of the electromechanical firing pin is controlled by a microcontroller receiving a signal from a Tx-Rx module, wherein the signal is received over at least one of a Wi-Fi signal and a satellite signal.

16. The system of claim 8, wherein the second closed loop identification device further comprises a Tx-Rx module, and wherein the Tx-Rx module is configured to transmit a device health signal to the at least one area command and control unit.

17. The system of claim 16, wherein the device health signal includes an indication that a component of the smart mine requires at least one of replacement and remediation.

18. The device of claim 4, further comprising a Tx-Rx module, wherein the Tx-Rx module is configured to transmit a device health signal to the at least one area command and control unit, and wherein the device health signal includes an indication that a component of the weapons system requires at least one of replacement and remediation.

19. The device of claim 5, wherein the closed loop identification device further comprises a speaker, wherein the speaker provides verbal feedback on the status of the weapons system while the weapons system is disarmed.

20. The device of claim 7, wherein the determined line of fire for the weapons system from the gyroscope sensor is used to disable the weapons system based on another closed loop identification device being within the determined line of fire.

* * * * *